(12) United States Patent
Wong et al.

(10) Patent No.: US 6,494,054 B1
(45) Date of Patent: Dec. 17, 2002

(54) MULTICOMPONENT REFRIGERATION FLUID REFRIGERATION SYSTEM WITH AUXILIARY AMMONIA CASCADE CIRCUIT

(75) Inventors: Kenneth Kai Wong, Amherst, NY (US); Boris Yudin, Grand Island, NY (US); Dante Patrick Bonaquist, Grand Island, NY (US); Mohammad Abdul-Aziz Rashad, Kenmore, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/930,166

(22) Filed: Aug. 16, 2001

(51) Int. Cl.$^7$ .................................................. F25B 7/00

(52) U.S. Cl. .............................. 62/335; 62/434; 62/613

(58) Field of Search .................... 62/335, 434, 613, 62/175, 612, 114, 75

(56) References Cited

U.S. PATENT DOCUMENTS

| | | | | |
|---|---|---|---|---|
| 3,817,046 A | * | 6/1974 | Aoki et al. ..................... | 62/40 |
| 4,504,296 A | * | 3/1985 | Newton et al. ................ | 62/31 |
| 4,755,200 A | * | 7/1988 | Liu et al. ....................... | 62/11 |
| 4,856,285 A | | 8/1989 | Acharya et al. ............... | 62/63 |
| 5,524,442 A | | 6/1996 | Bergman, Jr. et al. ......... | 62/86 |
| 5,706,663 A | | 1/1998 | Boiarski et al. ............... | 62/114 |
| 5,729,993 A | | 3/1998 | Boiarski et al. ............... | 62/175 |
| 6,041,620 A | * | 3/2000 | Olszewski et al. ............ | 62/612 |
| 6,065,305 A | * | 5/2000 | Arman et al. ................. | 62/613 |
| 6,176,102 B1 | | 1/2001 | Novak et al. ................. | 62/612 |
| 6,250,096 B1 | | 6/2001 | Bonaquist et al. ............ | 62/401 |

* cited by examiner

*Primary Examiner*—Denise L. Esquivel
*Assistant Examiner*—Melvin Jones
(74) *Attorney, Agent, or Firm*—Stanley Ktorides

(57) ABSTRACT

A refrigeration system wherein an ammonia refrigerant fluid in a cascade refrigeration circuit provides auxiliary refrigeration to a multicomponent refrigerant fluid which passes from an autorefrigerator to provide refrigeration to a heat load.

10 Claims, 3 Drawing Sheets

MULTICOMPONENT REFRIGERATION FLUID REFRIGERATION SYSTEM WITH AUXILIARY AMMONIA CASCADE CIRCUIT

TECHNICAL FIELD

This invention relates generally to the provision of refrigeration to a heat load wherein refrigeration is generated and provided to a heat load using a multicomponent refrigerant fluid.

BACKGROUND ART

Refrigeration is used extensively in the freezing of foods, production of pharmaceuticals, liquefaction of natural gas, and in many other applications wherein refrigeration is required to provide cooling duty to a heat load. Low temperature refrigeration (less than −80° F.) is desirable for use in food freezing applications. The primary advantage of low temperature refrigeration is that it provides for an increased throughout through the freezer that debottlenecks the freezing process.

A recent significant advancement in the field of refrigeration is the development of refrigeration systems using multicomponent refrigerants which are able to generate refrigeration much more efficiently than conventional systems and without the high operating costs incurred with the use of cryogenic liquids. These refrigeration systems, also known as mixed gas refrigerant systems or MGR systems, are particularly attractive for providing refrigeration at very low or cryogenic temperatures such as below −80° F.

MGR systems typically have higher initial capital costs than do conventional vapor compression systems. These high initial costs are due primarily to the need for larger or more complicated compressors, vessels and heat exchangers.

Accordingly it is an object of this invention to provide a refrigeration system which will enable the use of an MGR system which has less costly compressors, vessels and/or heat exchangers.

SUMMARY OF THE INVENTION

The above and other objects, which will become apparent to those skilled in the art upon a reading of this disclosure, are attained by the present invention, one aspect of which is:

A method for providing refrigeration comprising:

(A) compressing an ammonia refrigerant fluid, expanding the compressed ammonia refrigerant fluid, and warming the expanded ammonia refrigerant fluid;

(B) compressing a multicomponent refrigerant fluid, and cooling the compressed multicomponent refrigerant fluid in part by indirect heat exchange with the warming ammonia refrigerant fluid to produce cooled compressed multicomponent refrigerant fluid;

(C) expanding the cooled compressed multicomponent refrigerant fluid to produce refrigeration bearing multicomponent refrigerant fluid, and warming the refrigeration bearing multicomponent refrigerant fluid to provide refrigeration to a heat load; and (D) further warming the refrigeration bearing multicomponent refrigerant fluid to provide additional cooling to the compressed multicomponent refrigerant fluid.

Another aspect of the invention is:

Apparatus for providing refrigeration comprising:

(A) an autorefrigerator heat exchanger, a main compressor, a main expansion device and means for passing multicomponent refrigerant fluid from the main compressor to the autorefrigerator heat exchanger and from the autorefrigerator heat exchanger to the main expansion device;

(B) an auxiliary compressor, an auxiliary expansion device, and means for passing ammonia refrigerant fluid from the auxiliary compressor to the auxiliary expansion device, from the auxiliary expansion device to the autorefrigerator heat exchanger and from the autorefrigerator heat exchanger to the auxiliary compressor;

(C) a heat load device and means for passing multicomponent refrigerant fluid from the main expansion device to the heat load device; and (D) means for passing multicomponent refrigerant fluid from the heat load device to the autorefrigerator heat exchanger.

A further aspect of the invention is:

Apparatus for providing refrigeration comprising:

(A) a precooler, an autorefrigerator heat exchanger, a main compressor, a main expansion device and means for passing multicomponent refrigerant fluid from the main compressor to the precooler, from the precooler to the autorefrigerator heat exchanger and from the autorefrigerator heat exchanger to the main expansion device;

(B) an auxiliary compressor, an auxiliary expansion device, and means for passing ammonia refrigerant fluid from the auxiliary compressor to the auxiliary expansion device, from the auxiliary expansion device to the precooler and from the precooler to the auxiliary compressor;

(C) a heat load device and means for passing multicomponent refrigerant fluid from the main expansion device to the heat load device; and (D) means for passing multicomponent refrigerant fluid from the heat load device to the autorefrigerator heat exchanger.

Yet another aspect of the invention is:

Apparatus for providing refrigeration comprising:

(A) an autorefrigerator heat exchanger, a main compressor, a main expansion device and means for passing multicomponent refrigerant fluid from the main compressor to the autorefrigerator heat exchanger and from the autorefrigerator heat exchanger to the main expansion device;

(B) an auxiliary compressor, an auxiliary expansion device, and means for passing ammonia refrigerant fluid from the auxiliary compressor to the auxiliary expansion device, from the auxiliary expansion device to the autorefrigerator heat exchanger and from the autorefrigerator heat exchanger to the auxiliary compressor;

(C) means for passing multicomponent refrigerant fluid from the main expansion device to the autorefrigerator heat exchanger; and (D) means for providing a heat load to the autorefrigerator heat exchanger.

As used herein the term "expansion" means to effect a reduction in pressure.

As used herein the term "expansion device" means apparatus for effecting expansion of a fluid.

As used herein the term "compressor" means apparatus for effecting compression of a fluid.

As used herein the term "multicomponent refrigerant fluid" means a fluid comprising two or more species and capable of generating refrigeration.

As used herein the term "refrigeration" means the capability to reject heat from a subambient temperature system.

As used herein the term "refrigerant fluid" means fluid in a refrigeration process which undergoes changes in temperature, pressure and possibly phase to absorb heat at a lower temperature and reject it at a higher temperature.

As used herein the term "variable load refrigerant" means a mixture of two or more components in proportions such that the liquid phase of those components undergoes a continuous and increasing temperature change between the bubble point and the dew point of the mixture. The bubble point of the mixture is the temperature, at a given pressure, wherein the mixture is all in the liquid phase but addition of heat will initiate formation of a vapor phase in equilibrium with the liquid phase. The dew point of the mixture is the temperature, at a given pressure, wherein the mixture is all in the vapor phase but extraction of heat will initiate formation of a liquid phase in equilibrium with the vapor phase. Hence, the temperature region between the bubble point and the dew point of the mixture is the region wherein both liquid and vapor phases coexist in equilibrium. In the preferred practice of this invention the temperature differences between the bubble point and the dew point for a variable load refrigerant generally is at least 10° C., preferably at least 20° C., and most preferably at least 50° C.

As used herein the term "heat load" means a stream or object that requires a reduction in energy, or removal of heat, to lower its temperature or to keep its temperature from rising.

As used herein the term "ammonia refrigerant fluid" means a refrigerant fluid comprising ammonia.

As used herein the term "autorefrigerator heat exchanger" means a heat exchanger in a multicomponent refrigerant fluid cycle wherein a high pressure refrigerant stream is cooled against a returning low pressure refrigerant stream. The autorefrigerator heat exchanger may include other process streams.

DETAILED DESCRIPTION

Figure 1:
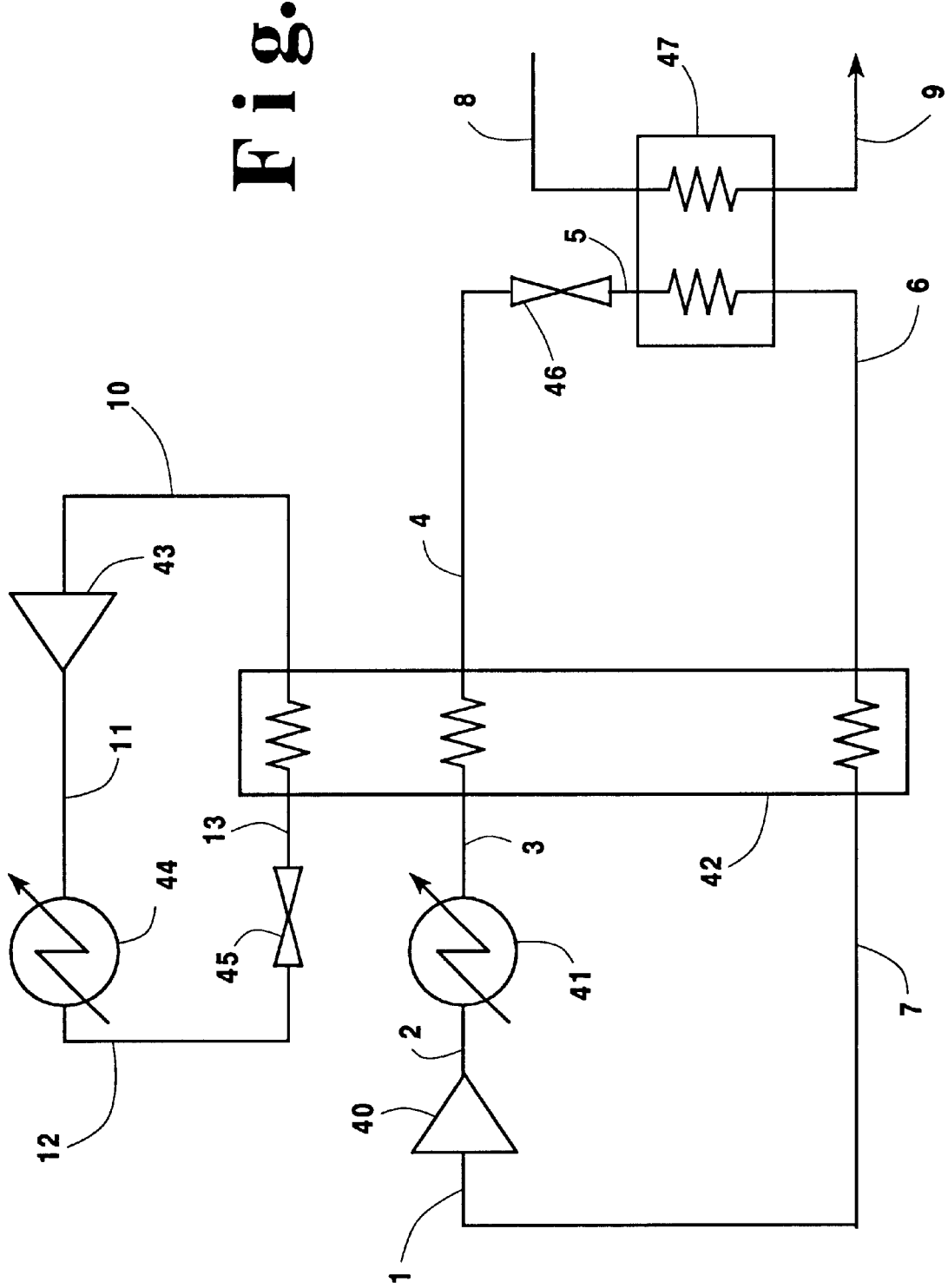
FIG. 1 is a schematic representation of one preferred embodiment of the refrigeration system of this invention.

The invention will be described in detail with reference to the Drawings. Referring now to FIG. 1, multicomponent refrigerant fluid 1 is compressed by passage through main compressor 40 to a pressure generally within the range of from 80 to 500 pounds per square inch absolute (psia). The resulting compressed multicomponent refrigerant fluid 2 is cooled of the heat of compression by passage through cooler 41 and then passed as stream 3 to autorefrigerator heat exchanger 42 wherein it is cooled by indirect heat exchange with warming multicomponent refrigerant fluid as will be more fully described below.

The multicomponent refrigerant fluid used in the practice of this invention preferably comprises at least two species from the group consisting of fluorocarbons, hydrofluorocarbons, hydrochlorofluorocarbons, fluoroethers, atmospheric gases and hydrocarbons, e.g. the multicomponent refrigerant fluid could be comprised only of two fluorocarbons. Preferably the multicomponent refrigerant useful in the practice of this invention is a variable load refrigerant.

One preferred multicomponent refrigerant useful with this invention preferably comprises at least one component from the group consisting of fluorocarbons, hydrofluorocarbons, and fluoroethers, and at least one component from the group consisting of fluorocarbons, hydrofluorocarbons, hydrochlorofluorocarbons, fluoroethers, atmospheric gases and hydrocarbons.

In one preferred embodiment of the invention the multicomponent refrigerant consists solely of fluorocarbons. In another preferred embodiment of the invention the multicomponent refrigerant consists solely of fluorocarbons and hydrofluorocarbons. In another preferred embodiment of the invention the multicomponent refrigerant consists solely of fluorocarbons, fluoroethers and atmospheric gases. Most preferably every component of the multicomponent refrigerant is either a fluorocarbon, hydrofluorocarbon, fluoroether or atmospheric gas.

Ammonia refrigerant fluid 10 is passed to auxiliary or cascade compressor 43 wherein it is compressed to a pressure generally within the range of from 40 to 250 psia. Generally the ammonia refrigerant fluid in the cascade refrigeration circuit comprises only ammonia although other components in addition to ammonia could be present. Moreover, in place of ammonia, the refrigerant fluid in the cascade refrigeration circuit could comprise one or more fluorocarbons, hydrofluorocarbons, hydrochlorofluorocarbons, hydrocarbons, fluoroethers and/or atmospheric gases. The description herein pertaining to the ammonia refrigerant fluid pertains also, as applicable, to the alternative cascade refrigeration circuit refrigerant fluid.

The compressed ammonia refrigerant fluid 11 is cooled of the heat of compression by passage through cooler 44 and resulting compressed ammonia refrigerant fluid 12 is passed to auxiliary expansion device 45 wherein it expanded to generate refrigeration. Preferably auxiliary expansion device 45 is a Joule-Thomson valve and the expansion is isenthalpic expansion. Refrigeration bearing ammonia refrigerant fluid 13 is then passed to autorefrigerator heat exchanger 42 wherein it is warmed to provide cooling to the multicomponent refrigerant fluid in addition to the cooling provided by the aforesaid warming multicomponent refrigerant fluid. The resulting warmed ammonia refrigerant fluid is withdrawn autorefrigerator heat exchanger and as stream 10 is passed to auxiliary compressor 43 and the cascade refrigeration circuit begins anew.

Cooled compressed multicomponent refrigerant fluid 4, which is generally at least partially condensed and preferably is totally condensed, is passed from autorefrigerator heat exchanger 42 to main expansion device 46 wherein it is expanded to generate refrigeration. Preferably the main expansion device is a Joule-Thomson valve and the expansion is isenthalpic expansion. Refrigeration bearing multicomponent refrigerant fluid 5 is then warmed to provide refrigeration to a heat load. One particularly preferred heat load in the practice of this invention is a food freezer and/or the contents of a food freezer and wherein the warming refrigeration bearing multicomponent refrigeration fluid provides refrigeration directly or through one or more intermediate heat exchange steps to the interior of the food freezer. Other heat loads which may receive refrigeration by use of the refrigeration system of this invention include reactors for the chemical process industry, freeze drying, biostorage, superconductivity, telecommunications, liquefaction of natural gas, and medical imaging.

In the embodiment illustrated in FIG. 1 the heat load device is heat exchanger 47 and the heat load is stream 8 which, for example, could be the atmosphere of a food freezer. The warming multicomponent refrigerant fluid provides refrigeration by indirect heat exchange to heat load 8 thereby producing refrigerated or cooled stream 9, for example for passage to a food freezer. Warmed multicomponent refrigerant fluid 6, which generally has been partially vaporized by the heat exchange with the heat load, is then passed to autorefrigerator heat exchanger 42 wherein it is further warmed to provide cooling by indirect heat exchange with the cooling multicomponent refrigerant fluid as was previously described. The resulting further warmed multicomponent refrigerant fluid 7, which preferably has been completely vaporized by the indirect heat exchange with the cooling multicomponent refrigerant fluid within autorefrigerator heat exchanger 42, is then passed as stream 1 to main compressor 40 and the multicomponent refrigerant fluid refrigeration cycle starts anew.

Figure 2:
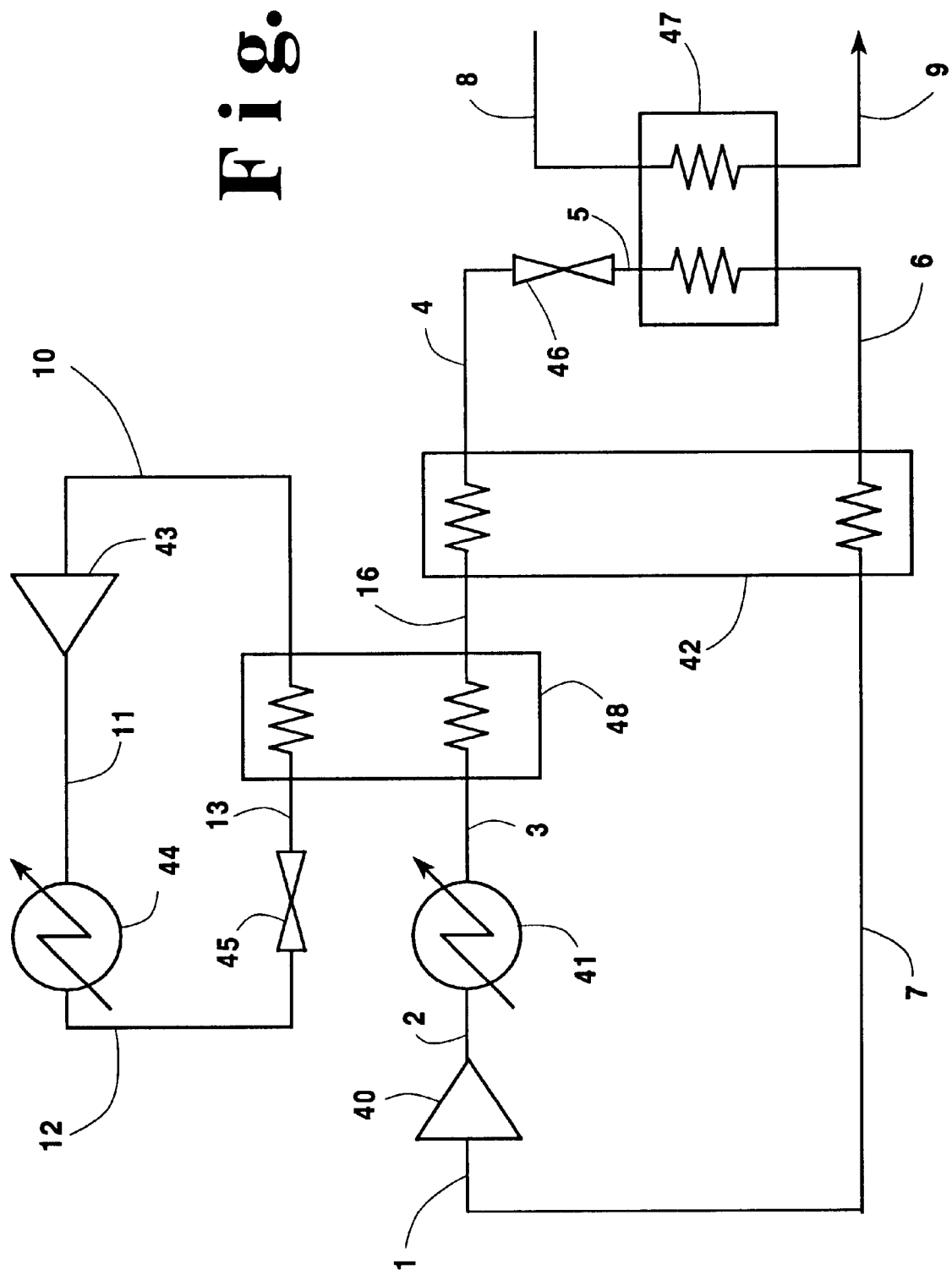
FIG. 2 is a schematic representation of another preferred embodiment of the refrigeration system of the invention wherein a precooler is used upstream of the autorefrigerator.

FIG. 2 illustrates another embodiment of the invention wherein a precooler is employed to provide cooling to the multicomponent refrigerant fluid upstream of the autorefrigerator heat exchanger. The numerals of FIG. 2 are the same as those of FIG. 1 for the common elements and these common elements will not be described again in detail.

Referring now to FIG. 2, compressed multicomponent refrigerant fluid 3 is passed to precooler 48 wherein it is cooled by indirect heat exchange with warming ammonia refrigerant fluid. The ammonia refrigerant fluid cascade refrigeration circuit operates in the same manner as was described with reference to FIG. 1 except that the refrigeration bearing ammonia refrigerant fluid is warmed by passage through precooler 48 rather than autorefrigerator heat exchanger 42. Cooled multicomponent refrigerant fluid 16 is withdrawn from precooler 48 and passed to autorefrigerator 42 wherein it is further cooled by indirect heat exchange with the warming multicomponent refrigerant fluid.

Figure 3:
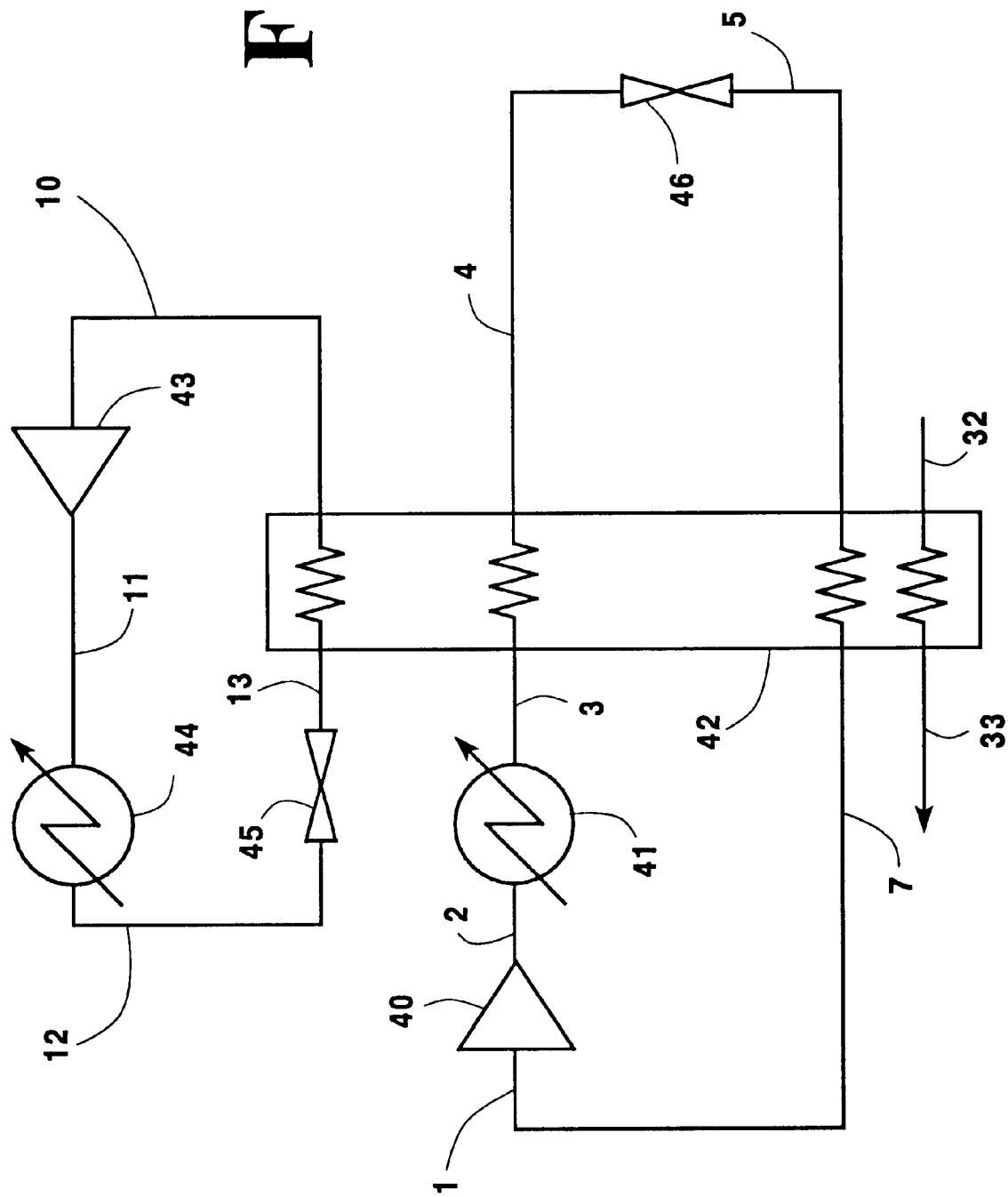
FIG. 3 is a schematic representation of another preferred embodiment of the refrigeration system of the invention wherein the heat load device is combined with the autorefrigerator.

FIG. 3 illustrates another embodiment of the invention wherein the heat load device is incorporated within the autorefrigerator heat exchanger. The numerals of FIG. 3 are the same as those of FIG. 1 for the common elements and these common elements will not be described again in detail.

Referring now to FIG. 3, refrigeration bearing multicomponent refrigerant fluid is passed from main expansion device 46 directly to autorefrigerator heat exchanger 42 wherein it is warmed by indirect heat exchange with a heat load and is further warmed by indirect heat exchange with cooling multicomponent refrigerant fluid. In the embodiment illustrated in FIG. 3 the heat load is stream 32 which, for example, could be the atmosphere of a food freezer and is provided to autorefrigerator 42 from which it emerges as refrigerated or cooled stream 33, for example for passage to a food freezer.

Although the invention has been described in detail with reference to certain preferred embodiments, those skilled in the art will recognize that there are other embodiments of the invention within the spirit and the scope of the claims.

What is claimed is:

1. A method for providing refrigeration comprising:
    (A) compressing an ammonia refrigerant fluid, expanding the compressed ammonia refrigerant fluid, and warming the expanded ammonia refrigerant fluid;
    (B) compressing a multicomponent refrigerant fluid, and cooling the compressed multicomponent refrigerant fluid in part by indirect heat exchange with the warming ammonia refrigerant fluid to produce cooled compressed multicomponent refrigerant fluid;
    (C) expanding the cooled compressed multicomponent refrigerant fluid to produce refrigeration bearing multicomponent refrigerant fluid, and warming the refrigeration bearing multicomponent refrigerant fluid to provide refrigeration to a heat load; and
    (D) further warming the refrigeration bearing multicomponent refrigerant fluid to provide additional cooling to the compressed multicomponent refrigerant fluid.

2. The method of claim 1 wherein the heat load comprises the atmosphere of a food freezer.

3. The method of claim 1 wherein the multicomponent refrigerant fluid is a variable load refrigerant.

4. The method of claim 1 wherein the expansion of the compressed ammonia refrigerant fluid is an isenthalpic expansion.

5. The method of claim 1 wherein the expansion of the cooled compressed multicomponent refrigerant fluid is an isenthalpic expansion.

6. The method of claim 1 wherein the cooling of the compressed multicomponent refrigerant fluid by heat exchange with the warming ammonia refrigerant fluid, and the cooling of the compressed multicomponent refrigerant fluid by heat exchange with the warming multicomponent refrigerant fluid occur simultaneously.

7. The method of claim 1 wherein the warming of the refrigeration bearing multicomponent refrigerant fluid to provide refrigeration to the heat load, and the warming of the refrigeration bearing multicomponent refrigerant fluid to provide cooling to the compressed multicomponent refrigerant fluid occur simultaneously.

8. Apparatus for providing refrigeration comprising:
    (A) an autorefrigerator heat exchanger, a main compressor, a main expansion device and means for passing multicomponent refrigerant fluid from the main compressor to the autorefrigerator heat exchanger and from the autorefrigerator heat exchanger to the main expansion device;
    (B) an auxiliary compressor, an auxiliary expansion device, and means for passing ammonia refrigerant fluid from the auxiliary compressor to the auxiliary expansion device, from the auxiliary expansion device to the autorefrigerator heat exchanger and from the autorefrigerator heat exchanger to the auxiliary compressor;
    (C) a heat load device and means for passing multicomponent refrigerant fluid from the main expansion device to the heat load device; and
    (D) means for passing multicomponent refrigerant fluid from the heat load device to the autorefrigerator heat exchanger.

9. Apparatus for providing refrigeration comprising:
    (A) a precooler, an autorefrigerator heat exchanger, a main compressor, a main expansion device and means for passing multicomponent refrigerant fluid from the main compressor to the precooler, from the precooler to the autorefrigerator heat exchanger and from the autorefrigerator heat exchanger to the main expansion device;
    (B) an auxiliary compressor, an auxiliary expansion device, and means for passing ammonia refrigerant fluid from the auxiliary compressor to the auxiliary expansion device, from the auxiliary expansion device to the precooler and from the precooler to the auxiliary compressor;

(C) a heat load device and means for passing multicomponent refrigerant fluid from the main expansion device to the heat load device; and (D) means for passing multicomponent refrigerant fluid from the heat load device to the autorefrigerator heat exchanger.

10. Apparatus for providing refrigeration comprising:

(A) an autorefrigerator heat exchanger, a main compressor, a main expansion device and means for passing multicomponent refrigerant fluid from the main compressor to the autorefrigerator heat exchanger and from the autorefrigerator heat exchanger to the main expansion device;

(B) an auxiliary compressor, an auxiliary expansion device, and means for passing ammonia refrigerant fluid from the auxiliary compressor to the auxiliary expansion device, from the auxiliary expansion device to the autorefrigerator heat exchanger and from the autorefrigerator heat exchanger to the auxiliary compressor;

(C) means for passing multicomponent refrigerant fluid from the main expansion device to the autorefrigerator heat exchanger; and (D) means for providing a heat load to the autorefrigerator heat exchanger.

* * * * *